(12) United States Patent
Miloaga et al.

(10) Patent No.: US 11,688,909 B2
(45) Date of Patent: Jun. 27, 2023

(54) BATTERY ENCLOSURE

(71) Applicant: JOHNS MANVILLE, Denver, CO (US)

(72) Inventors: Dana Gabriela Miloaga, Lakewood, CO (US); Georg Käsmeier, Munich (DE); Stefan Schierz, Munich (DE); Markus Freiberger, Olching (DE); Leonie van der Meulen, Munich (DE)

(73) Assignee: Johns Manville, Denver, CO (US)

( * ) Notice: Subject to any disclaimer, the term of this patent is extended or adjusted under 35 U.S.C. 154(b) by 136 days.

(21) Appl. No.: 16/827,903

(22) Filed: Mar. 24, 2020

(65) Prior Publication Data

US 2021/0305544 A1 Sep. 30, 2021

(51) Int. Cl.
*H01M 50/20* (2021.01)
*B60L 50/64* (2019.01)
*H01M 50/186* (2021.01)
*H01M 50/191* (2021.01)
*H01M 50/166* (2021.01)

(52) U.S. Cl.
CPC ............. *H01M 50/20* (2021.01); *B60L 50/64* (2019.02); *H01M 50/166* (2021.01); *H01M 50/186* (2021.01); *H01M 50/191* (2021.01); *H01M 2220/20* (2013.01)

(58) Field of Classification Search
CPC .. H01M 50/20; H01M 50/166; H01M 50/186; H01M 50/191; H01M 2220/20; B60L 50/64; B60L 50/65; B60L 50/66
See application file for complete search history.

(56) References Cited

U.S. PATENT DOCUMENTS

| | | | | |
|---|---|---|---|---|
| 2012/0251863 | A1* | 10/2012 | Berger | H01M 50/116 |
| | | | | 429/99 |
| 2015/0318525 | A1 | 11/2015 | Maguire et al. | |
| 2018/0123098 | A1* | 5/2018 | Maguire | H01M 50/249 |
| 2018/0337377 | A1* | 11/2018 | Stephens | H01M 50/224 |
| 2019/0237720 | A1* | 8/2019 | Lucchesi | H01M 50/20 |
| 2020/0001728 | A1* | 1/2020 | Spielvogel | B60L 50/66 |
| 2020/0152935 | A1* | 5/2020 | Wynn | H01M 50/691 |
| 2021/0170853 | A1* | 6/2021 | Schmidt | B62D 25/20 |

* cited by examiner

*Primary Examiner* — Matthew T Martin
*Assistant Examiner* — Adam J Francis
(74) *Attorney, Agent, or Firm* — Robert D. Touslee (57) ABSTRACT

A battery enclosure and method for manufacturing the same from organosheet materials. The battery enclosure includes a top cover with crossbeams integrated therein by overmolding that secures to a bottom panel to enclose a space for containing components of a battery. The bottom panel includes overmolded structural ribs to provide strength and rigidity to the bottom panel. An outer cover removably secure the top cover to the bottom panel and includes a honeycomb structure to crush upon impact and protect the battery components. The method comprises forming each of the components of the battery enclosure from a mixture of organosheets, reinforcing members, and overmolded elements to reduce the weight and complexity of manufacturing for the battery enclosure.

16 Claims, 6 Drawing Sheets

BATTERY ENCLOSURE

BACKGROUND

Electric and hybrid vehicles typically employ batteries for storage of electrical energy. The power stored in the battery may be applied to an electric motor, a traction motor, or other motor for propelling the vehicle. Such batteries are intended to propel the vehicle an appreciable distance and typically consist of multiple cells connected in series and parallel to meet the voltage and energy storage requirements for the vehicle.

Even with improvements in battery and energy storage technology, the batteries may constitute a significant mass of the vehicle. Adding to the mass is an enclosure typically having a tray or support structure and a cover to enclose and secure the battery in the vehicle. The enclosure must be stiff and robust to withstand various static and dynamic loads experienced by the battery during operation of the vehicle. Additionally, the battery enclosure requires significant reinforcement to prevent intrusion of objects into the battery during a potential collision.

Battery enclosures have typically been formed of steel or aluminum. Steel enclosures introduce additional mass to the vehicle which must be propelled. Aluminum enclosures, which are less dense than steel, typically consists of multiple parts that are joined together and welded in place. The manufacturing time and expense for aluminum enclosures results in overall increases in costs in exchange for the savings in weight.

The use of fiber-reinforced composites is growing in popularity with applications in transportation, consumer goods, wind energy, and infrastructure. Some of the many reasons for choosing composites over traditional materials such as metals or non-reinforced plastics include reduced weight, corrosion resistance, and improved mechanical strength as well as decreased manufacturing costs.

BRIEF SUMMARY

This summary is a high-level overview of various aspects of the invention and introduces some of the concepts that are further described in the Detailed Description section below. This summary is not intended to identify key or essential features of the claimed subject matter, nor is it intended to be used in isolation to determine the scope of the claimed subject matter. The subject matter should be understood by reference to appropriate portions of the entire specification of this patent, any or all drawings and each claim.

The embodiments discussed below include a organosheet battery enclosure and method for making the same are described herein. The organosheet battery enclosure provides simplicity and reduction in number of parts and difficulty as well as time required for forming and assembling. The organosheet battery enclosure enables mass savings over typical systems and is also recyclable without sacrificing performance of the battery enclosure. One general aspect includes a battery enclosure for a battery of a vehicle system, the battery enclosure including a bottom panel. The bottom panel includes a first reinforced thermoplastic composite sheet and one or more integrally formed structural ribs formed of thermoplastic material to distribute weight and align cooling plates and cells of the battery. The bottom panel also includes a first attachment member positioned at a perimeter of the bottom panel. The battery enclosure also includes a top panel to enclose the cells of the battery when coupled to the bottom panel. The top panel includes a top inner cover formed of a second reinforced thermoplastic composite sheet molded to define a cavity. The top panel also includes one or more crossbeams including a third reinforced thermoplastic composite sheet and integrally formed thermoplastic support ribs, the one or more crossbeams coupled to an inner surface of the top inner cover. The battery enclosure also includes one or more outer covers including an outer flange having a second attachment member included therein to releasably couple to the first attachment member as well as a structural honeycomb and an inner flange to retain the top panel in position when the one or more outer covers are secured to the bottom panel.

Implementations of the battery enclosure may include one or more of the following features. The battery enclosure may further include a longitudinal beam coupled to the bottom panel, the longitudinal beam and the one or more crossbeams defining a plurality of positions to receive the cells of the battery. The longitudinal beam may be formed of a reinforced thermoplastic composite. The longitudinal beam may include integrally formed attachment points for components of the battery. The first reinforced thermoplastic composite sheet may be reinforced with at least one of glass fibers or carbon fiber. The first reinforced thermoplastic composite sheet, the second reinforced thermoplastic composite sheet, and the third reinforced thermoplastic composite sheet may include the same thermoplastic material. The structural ribs and the first attachment member may be integrally formed into the first reinforced thermoplastic composite sheet. The top inner cover may further include an electromagnetic interference shielding layer and a fire resistant layer. The one or more crossbeams may be coupled to the top inner cover by at least one of hot plate welding, infrared welding, ultrasonic welding, vibration welding, friction welding, bonding, or structural fasteners. The one or more outer covers may be coupled to the top inner cover at a perimeter of the top inner cover. The structural honeycomb may be formed of a thermoplastic and positioned around the perimeter of the top inner cover to protect an internal compartment of the battery enclosure from impacts. The bottom panel may include an integrated seal around the perimeter of the bottom panel that seals an internal space of the battery enclosure when the bottom panel, top panel, and one or more outer covers are coupled together. The one or more outer covers may be integrated with the top inner cover.

Another general aspect includes a method for manufacturing a battery enclosure for a vehicle system, the method including forming a top panel by molding a top inner cover from a first thermoplastic composite sheet. The method also includes forming a crossbeam by injection molding support ribs onto a second thermoplastic composite sheet. The method also includes forming a outer cover including an integrated honeycomb structure and first attachment members. The method further includes coupling the crossbeam and the outer cover to the top inner cover. The method further includes forming a bottom panel by at least molding a bottom sheet from a third thermoplastic composite sheet and integrally forming support ribs and second attachment members onto the bottom sheet. The method also includes coupling a longitudinal beam to the bottom panel and securing the top panel to the bottom panel by coupling the first attachment members and the second attachment members.

Implementations may include one or more of the following features. Molding the bottom sheet may include positioning the second thermoplastic composite sheet, positioning a unidirectional tape on at least one side of the second thermoplastic composite sheet, and applying heat and pressure to the unidirectional tape and second thermoplastic composite sheet to mold the unidirectional tape to the at least one side of the second thermoplastic composite sheet. The unidirectional tape may include carbon fiber and/or glass fiber unidirectional tapes. Coupling the crossbeam and the outer cover to the top inner cover may include at least one of hot plate welding, infrared welding, ultrasonic welding, vibration welding, friction welding, bonding, or structural fasteners. Forming the crossbeam may include cutting the second thermoplastic composite sheet to a pre-molding shape, applying unidirectional tape to the pre-molding shape, and applying heat and pressure to the second thermoplastic composite sheet and unidirectional tape to form a blank. The method may also include loading the blank into an open mold and injection molding the support ribs onto the blank. Coupling the longitudinal beam to the bottom panel may include integrally forming the longitudinal beam to the bottom panel or securing the longitudinal beam to the bottom panel. The crossbeam and the outer cover may be formed of glass fiber or carbon fiber reinforced thermoplastic. Molding the top inner cover may include coupling the first thermoplastic composite sheet with an electromagnetic shielding layer and a fire resistant layer.

BRIEF DESCRIPTION OF THE DRAWINGS

A further understanding of the nature and advantages of various embodiments may be realized by reference to the following figures. In the appended figures, similar components or features may have the same reference label. Further, various components of the same type may be distinguished by following the reference label by a dash and a second label that distinguishes among the similar components. If only the first reference label is used in the specification, the description is applicable to any one of the similar components having the same first reference label irrespective of the second reference label. The present invention is described in conjunction with the appended figures.

DETAILED DESCRIPTION OF THE INVENTION

The subject matter of embodiments of the present invention is described with specificity to meet statutory requirements, but this description is not necessarily intended to limit the scope of the claims. The claimed subject matter may be embodied in other ways, may include different elements or steps, and may be used in conjunction with other existing or future technologies. This description should not be interpreted as implying any particular order or arrangement among or between various steps or elements except when the order of individual steps or arrangement of elements is explicitly described.

The embodiments described herein relate to structural thermoplastic polymer composite battery enclosures and methods for making the same. The battery enclosure is formed of fully impregnated thermoplastic sheet products, referred to herein as organosheets. The organosheets are fully impregnated with thermoplastic materials that allow the organosheets product to be reheated and molded into a given shape. The battery enclosures are specifically formed as multi-material products including reinforced organosheets sheets as well as reinforcing materials including thermoplastic materials. The battery enclosure is formed of the multi-material products through overmolding to integrate the structural reinforced components with the fiber-reinforced organosheets. The overmolding process may be included as part of a molding procedure or may be a subsequent procedure, for example with a structural component initially molded and subsequently overmolded to form the final components of the battery enclosure.

Thermoplastic materials, including organosheets, allow for complex geometries to be formed via overmolding without requiring complex machining operations or the creation of numerous components to form a single complex geometry. The thermoplastic materials can be incorporated with metallic inserts, such as bushings, threaded inserts, and other such objects to further provide flexibility in manufacturing. The thermoplastic material can be formed into sheets, such as fiber-reinforced prepregs also referred to as organosheets, which may then be molded or re-formed after heating, enabling the overmolding process to result in complex structural elements not easily achieved in other manufacturing methods.

The battery enclosure discussed herein provide a number of advantages over typical battery enclosures for batteries of vehicle systems. The battery enclosure is primarily formed of organosheets which provide strength and rigidity to enclose and protect the battery while also introducing less mass to the vehicle system them typical metal enclosures. The integrated components of the battery enclosure described herein serve to enclose and protect the battery components from potential damage. Additionally, the use of organosheets enables methods of manufacturing, such as overmolding, which reduce the number of distinct parts making up the enclosure. The reduction in the number of parts and the use of manufacturing methods such as injection molding reduce the time required to form the battery enclosure as well as the number of components that must be individually formed. The use of fewer component pieces increases assembly speed as well as ease of maintenance. Further still, the thermoplastic polymer compounds allow recycling of the battery enclosures, or at least most components of the battery enclosures.

The embodiments described herein relate to fiber-reinforced organosheets. The organosheets are formed from thermoplastic resins (which may include typical thermoplastic resins as well as reactive resins), activators, and catalysts. As used herein, the term reactive resin refers to monomers or oligomers that are capable of polymerizing to form thermoplastic polymers. Exemplary reactive resins include lactams such as caprolactam and laurolactam as well as lactones, cyclic butylene terephthalate (CBT), methyl methacrylate, precursors of thermoplastic polyurethane, or mixtures thereof. Other monomers may be used, including those used to form polymers including polyamide 6 (nylon 6), polyamide 12 (nylon 12), polybutylene terephthalate (PBT), cyclic ethylene terephthalate (CET), polyethylene terephthalate (PET), and poly(methyl methacrylate) (PMMA). Additional monomers or suitable materials known to those in the art may be used as well and are intended to be covered by this description. In a specific embodiment, the reactive resin comprises or consists of caprolactam. In some embodiments, mixtures of monomers and/or oligomers may be used, such as mixtures of caprolactam and laurolactam, which will copolymerize in the curing oven to form copolymers with tailored properties.

The organosheets are reinforced with a fiber strand made of any synthetic or natural fiber suitable for reinforcing thermoplastics produced by injection molding or compression molding. Exemplary fiber materials include cellulose, cotton, hemp, jute, flax, ramie, sisal, wood, silk, sinew, catgut, wool, rayon, modal, Lyocell, any derivative of petrochemicals, glass, basalt, metallic, carbon, polyamide, polyester, phenol-formaldehyde, polyvinyl alcohol, polyvinyl chloride, polypropylene, polyethylene, acrylic polyesters, aramide, polyurethane, or any other suitable material and various combinations thereof.

The organosheets include prepreg products described in further detail in U.S. application Ser. No. 15/944,249 filed Apr. 3, 2018, entitled "SYSTEM FOR PRODUCING A FULLY IMPREGNATED THERMOPLASTIC PREPREG," the entire disclosure of which is hereby incorporated by reference for all purposes, as if fully set forth herein. Additional description are provided in U.S. application Ser. No. 14/088,034 filed Nov. 22, 2013, and titled "FIBER-CONTAINING PREPREGS AND METHODS AND SYSTEMS OF MAKING," the entire disclosure of which is hereby incorporated by reference, for all purposes, as if fully set forth herein.

Figure 1:
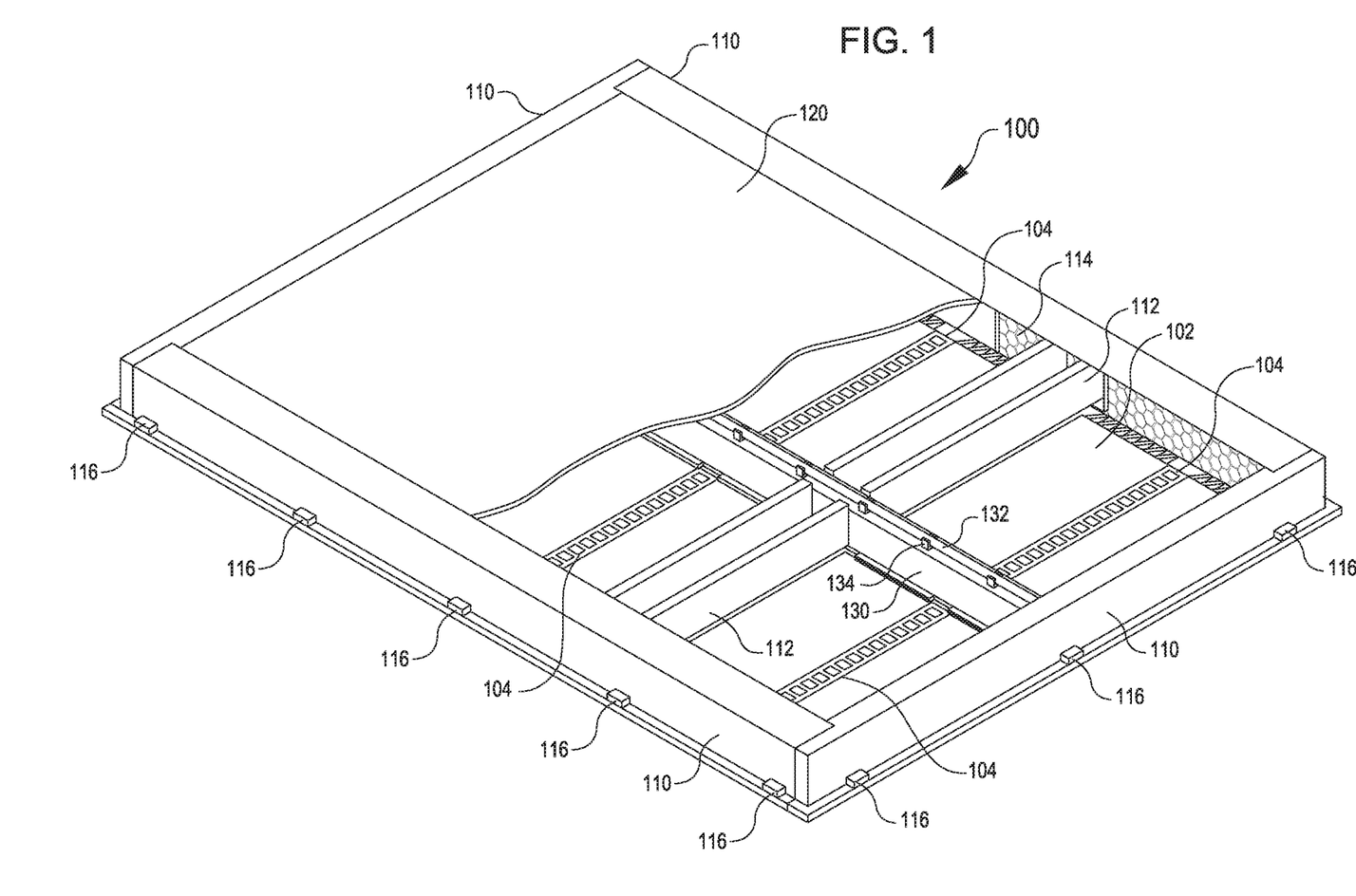
FIG. 1 is a perspective view of a organosheet battery enclosure having a partial cut-away view of the interior, according to some embodiments.

Turning to FIG. 1, a perspective view of a battery enclosure 100 formed of organosheets is shown with a portion of a top cover 120 cut away. The battery enclosure 100 defines an inner cavity to enclose cells of a battery for powering a vehicle system, such as an electric vehicle. The battery enclosure 100 may fit within a battery compartment of the electric vehicle. Though the battery enclosure 100 is described with respect to a battery for powering operation of an electric vehicle, the description included herein will be understood by those with skill in the art to be applicable to other types of devices powered by batteries, including consumer electronics, vehicles, toys, tools, and other such powered devices.

The battery enclosure 100 includes a bottom panel 102 that supports the components of the battery. For example, the bottom panel 102 may support cooling units and power cells of a battery. The bottom panel 102 is able to withstand piercing from external objects to protect the battery in the event of a collision. The bottom panel 102 is formed of nylon 6 reinforced sheets, such as the organosheet material described above. The bottom panel 102 may further include unidirectional tape or fiber reinforcement to provide additional strength and rigidity to the bottom panel 102 allowing it to support and protect the battery. The reinforcement may be integral within the thermoplastic material forming the bottom panel 102 (i.e., fiber-reinforced thermoplastic prepreg or organosheet) or may be connected to the bottom panel 102 and form a skeleton structure comprising or consisting of carbon fibers or glass fibers for example.

The bottom panel 102 has structural ribs 104 integrally formed thereon to provide rigidity to the bottom panel 102 as well as define locations for components of the battery, such as battery cells. As shown in FIG. 1, the structural ribs 104 define rectangular regions where the cells of the battery and associated cooling units reside when assembled.

A longitudinal beam 130 extends the length of the inner cavity. The longitudinal beam 130 may include connections 134 for wires 132 or components of the battery, such as elements of the cooling system of the battery. The longitudinal beam 130 may be formed of metal, such as aluminum or steel, to provide strength and rigidity to the middle section of the battery enclosure 100. In some examples, the longitudinal beam 130 may be formed of a organosheet material. The longitudinal beam 130 may be coupled to the bottom panel 102, or may be releasably secured to the bottom panel 102. In some examples, the longitudinal beam 130 is integrally formed or overmolded with the bottom panel 102. The longitudinal beam 130 may be fixed to the bottom panel 102 with fasteners, adhesives, or other joining methods such as welding. Though the longitudinal beam 130 is shown and described connected to the bottom panel 102, in some examples, the longitudinal beam 130 may couple to an inner surface of the top cover 120.

A top cover 120 of the battery enclosure is shown, partially removed to provide a view into the interior of the battery enclosure 100. The top cover 120 encloses the cavity when coupled to the bottom panel 102. The top cover 120 is formed of a organosheet material, and may be formed of the same material as the bottom panel 102. The top cover 120 includes side walls and a flange around its perimeter. The top cover 120 and side walls define the cavity when secured to the bottom panel 102. When coupled together, the top cover 120 and the bottom panel 102 form a recess or cavity within which the components of the battery are stored. The top cover 120 is shown and described in further detail with respect to FIG. 2.

The top cover 120 has crossbeams 112 coupled to an inner surface of the top cover 120. The crossbeams 112 may be welded, joined, adhered, or otherwise fastened to the top cover 120. The crossbeams 112 provide additional strength and rigidity, especially for a middle portion of the top cover 120 away from the edges of the top cover 120. The crossbeams 112 are formed from a organosheet and include integral structural ribs to provide webbing across the cross section of the crossbeam 112. The integral structural ribs are overmolded when the crossbeams 112 are formed from a sheet of the organosheet and may be formed of a similar or identical thermoplastic material.

Around the perimeter of the battery enclosure 100 are four outer covers 110. The outer covers 110 include attachment members 116 that secure to the bottom panel 102 and releasably secure the top cover 120 to the bottom panel 102. The outer covers 110 include a honeycomb structure 114 that is positioned between an inner surface of the outer cover 110 and an outer surface of the top cover's side walls. The honeycomb structure 114 provides protection against crushing forces experienced on the sides of the battery enclosure 100 due to impact.

The honeycomb structure 114 includes a honeycomb pattern extruded in a single direction and formed of a thermoplastic material. The honeycomb structure 114 is positioned adjacent the internal surface of the outer covers 110 and also adjacent the outer surface of the side walls of the top cover 120. Tubes or passages are defined by the extruded honeycomb pattern and are oriented perpendicular to the surface of the top cover's side walls. This arrangement provides strength and rigidity while also being designed to crush when impacted or loaded with a particular force. The particular force may, for example include a typical force experienced during a side impact of a vehicle. The honeycomb structure 114 can be designed having cell diameters and wall thicknesses designed to absorb the energy of an impact by crushing. For example, larger cell diameters and thinner walls may result in a honeycomb structure 114 that is more susceptible to crushing than a honeycomb structure having thicker walls and smaller diameter cells.

The outer covers 110 are shown as four distinct pieces, but in some examples the outer covers 110 may include more or fewer pieces as desired. For example, the outer cover 110 may be formed of a single piece that forms a frame around the perimeter of the top cover 120. In some examples, the outer cover 110 may cover more than the perimeter of the top cover 120, for example, the outer cover 110 may cover the entirety of the top cover 120. Additionally, in some examples, the top cover 120 and the outer cover 110 may be fixedly attached together, for example after being welded or molded together.

Figure 2:
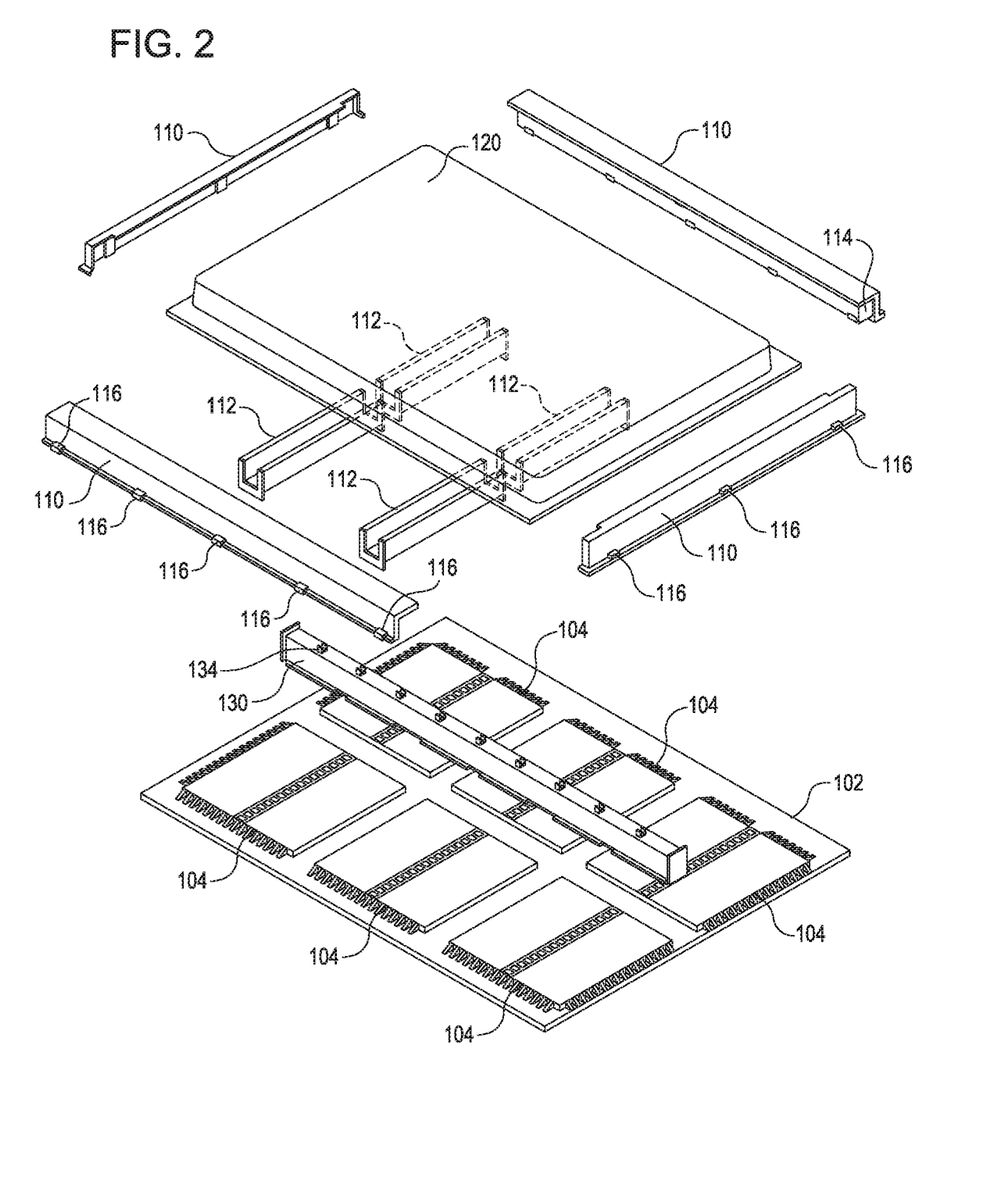
FIG. 2 is an exploded view of the organosheet battery enclosure of FIG. 1, according to some embodiments.

FIG. 2 is an exploded view of the organosheet battery enclosure of FIG. 1, according to some embodiments. The exploded view shows the components of FIG. 1, including the bottom panel 102, longitudinal beam 130, crossbeams 112, top cover 120, and outer cover 110. These elements are the same elements described above with respect to FIG. 1 presented in an exploded view.

The bottom panel 102 is shown as a planar surface with the structural ribs 104 protruding from the surface of the bottom panel 102. The bottom panel 102 may include molded cavities or recesses, for example to receive and position cooling units as well as cells of the battery. Similarly, as described above, though the structural ribs 104 are shown defining rectangular shapes to receive the cooling units and cells of the battery, other shapes and configurations are intended to be covered by this description. The structural ribs 104 may define other shapes, configurations, or layouts. For example, the structural ribs 104 may define square, circular, elliptical, or other such shapes. In some examples, the structural ribs 104 may be designed to provide strength and rigidity in and around areas of stress within the bottom panel 102.

The areas of stress may be identified with a Finite Element Analysis (FEA) based on computer aided design (CAD) simulation of the battery enclosure based on various loading situations. The reinforcement may be shaped and applied to the bottom panel 102 to alleviate or reinforce the areas of highest stress within the bottom panel 102. The areas of highest stress may be identified as areas exceeding a predetermined threshold of a strength of the material forming the bottom panel 102. This may include, in some examples, identifying and reinforcing areas of stress concentration or areas anticipated to receive stress during operation of the vehicle.

Figure 5:
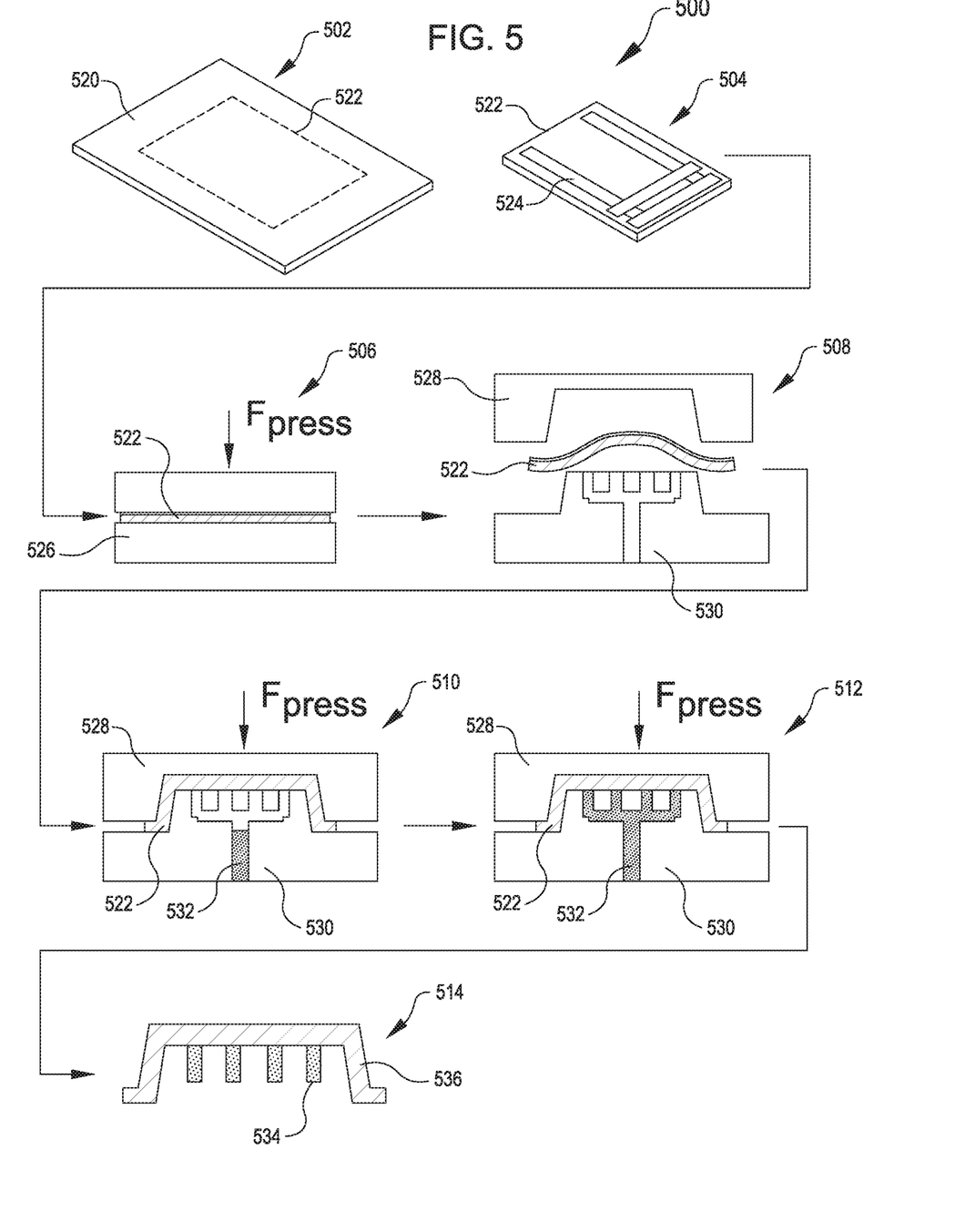
FIG. 5 is a simplified diagram showing a process for forming overmolded components of a organosheet battery enclosure, according to some embodiments.

The structural ribs 104 are integrally formed with the bottom panel 102, for example through overmolding of the bottom panel 102 as described with respect to FIG. 5. The bottom panel 102 may be formed of an organosheet, and the structural ribs 104 may be molded of thermoplastic material at the same time that the bottom panel 102 is formed. The use of thermoplastic material, such as those examples listed above, ensures that the overmolding process will result in a single unibody component with both the bottom panel 102 and the structural ribs 104.

Though the structural ribs 104 have been described as being integral with the bottom panel 102, in some examples, the structural ribs 104 may be formed separately from the bottom panel 102 and adhered to or secured to the bottom panel 102 through the use of adhesives or joining techniques. Some exemplary joining techniques may include hot plate welding, infrared welding, ultrasonic welding, vibration welding, friction welding, or bonding. In some examples, fasteners such as screws and bolts may also be used to affix the structural ribs 104 to the bottom panel 102.

The longitudinal beam 130 extends the length of the inner cavity of the top cover 120. The longitudinal beam 130 may include connections 134 for components of the battery, such as elements of the cooling system of the battery. The longitudinal beam 130 may have a height that is less than the height of the cavity formed within the battery enclosure. The reduced height may allow components such as high voltage wires or other components to be routed along the longitudinal beam 130 and thereby maintain a compact footprint of the battery enclosure 100. In some examples, the wires or components of the battery may be routed through a center of the longitudinal beam 130. For example, the longitudinal beam 130 may be hollow with an internal cavity running the length of the longitudinal beam 130. In some examples, the internal volume of the longitudinal beam 130 may be occupied with one or more structural flanges or ribs to further strengthen the longitudinal beam 130.

The longitudinal beam 130 may be formed of metal, such as aluminum, to provide strength and rigidity to the middle section of the battery enclosure 100. In some examples, the longitudinal beam 130 may be formed of a organosheet material. The longitudinal beam 130 may be coupled to the bottom panel 102, or may be releasably secured to the bottom panel 102. In a specific embodiment, the longitudinal beam 130 is integrally formed or overmolded with the bottom panel 102. The longitudinal beam 130 may be fixed to the bottom panel 102 with fasteners, adhesives, or other joining methods such as welding. Though the longitudinal beam 130 is shown and described connected to the bottom panel 102, in some examples, the longitudinal beam 130 may couple to an inner surface of the top cover 120.

Though shown as a single element extending along the length of the bottom panel 102, the longitudinal beam 130 may be formed of multiple sections, for example two sections placed end to end, to extend the length of the bottom panel 102. At the ends of the longitudinal beam 130, the longitudinal beam 130 may include connections to couple to the internal surface of the top cover 120. These connections may be releasable, for example when the longitudinal beam 130 is coupled or fixed to the bottom panel 102, the connections may slidably engage with slots or tabs on the inner surface of the top cover 120 when assembled.

The crossbeams 112 are shown disconnected from the top cover 120. The crossbeams 112 may be welded, joined with fasteners, adhered, or otherwise fastened to the top cover 120. The crossbeams 112 provide additional strength and rigidity, especially for a middle portion of the top cover 120 away from the edges of the top cover 120. The crossbeams 112 are formed from a organosheet and include structural ribs across the cross section of the crossbeam 112. The structural ribs are overmolded when the crossbeams 112 are formed from a sheet of the organosheet and are typically formed of a similar or identical thermoplastic material.

Figure 6:
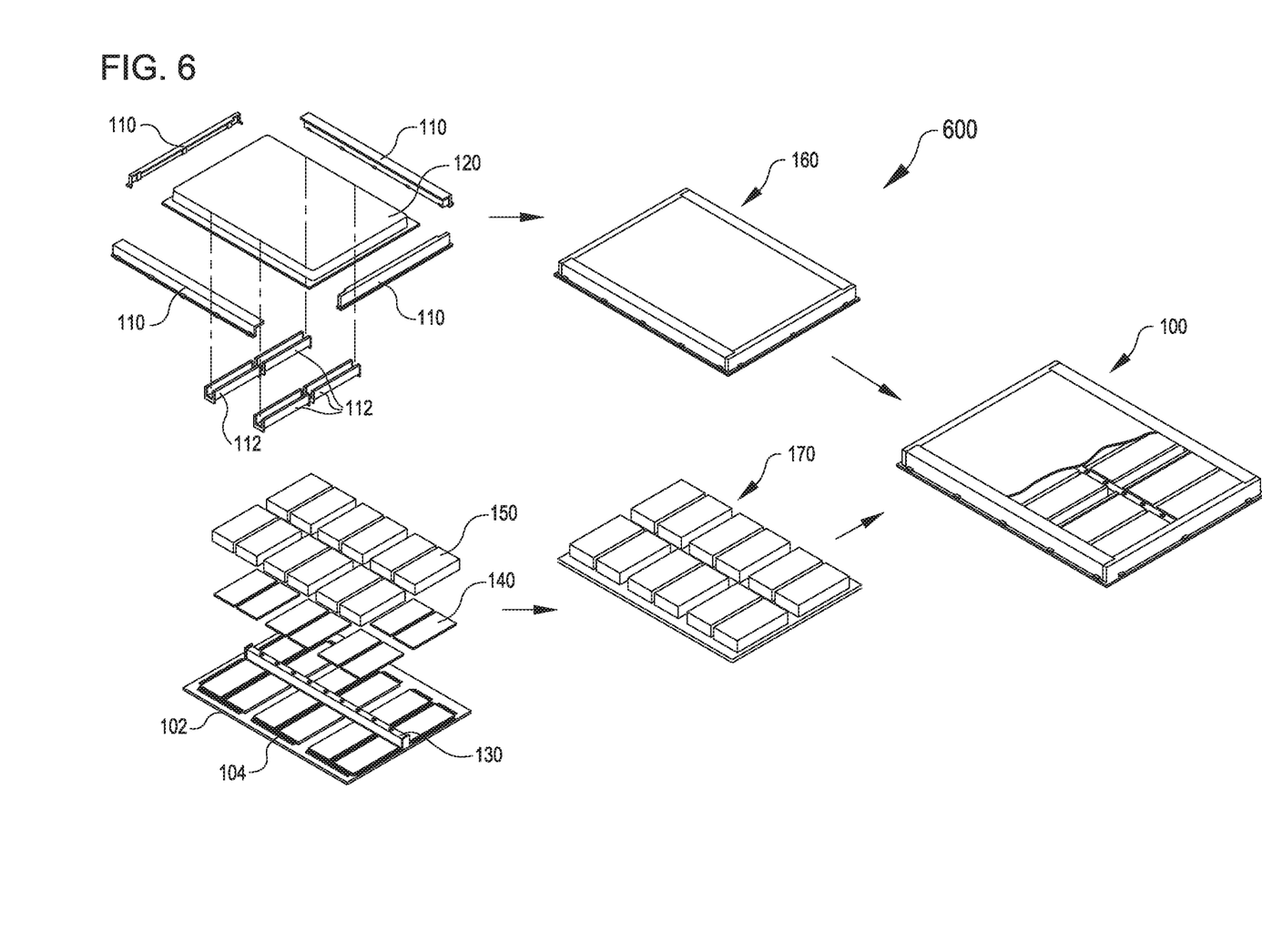
FIG. 6 is a simplified diagram showing a process for assembling components of a thermoplastic polymer battery enclosure, according to some embodiments.

The crossbeams 112 may be formed by a process similar to the process described with respect to FIG. 6. The crossbeams 112 may primarily consist of a sheet of organosheet with fiber reinforcement and be overmolded with structural flanges or ribs to provide additional strength against bending and flexing while maintaining a low mass.

Though four crossbeams 112 are shown in FIG. 2, there may be more than four or fewer than four as desired.

Furthermore, the crossbeams 112 are shown extending from the longitudinal beam 130 to the edge of the top cover 120. In some examples, the crossbeams 112 may be formed as a single segment that extends across the width of the top cover 120. In such examples, the longitudinal beam 130 may be formed of multiple components or the longitudinal beam 130 and/or crossbeams 112 may include half-lap joints that enable overlap of the two continuous components.

The top cover 120 of the battery enclosure 100 defines and encloses a cavity when coupled to the bottom panel 102 due to a recess molded in the top cover 120. The top cover 120 may include selective reinforcement regions where additional reinforcement is placed and bonded to the composite material. Some examples of additional reinforcement include glass fiber reinforcements and carbon fiber reinforcements, such as, for example a unidirectional tape applied to the organosheet material. The reinforcements may be focused in portions of the top cover 120 that are expected to receive weight or stress during operation of the vehicle, either static or dynamic. Such areas may be identified by an FEA program performing a load simulation as described above with respect to the bottom panel 102.

The top cover 120 includes side walls and a flange around its perimeter that abuts the bottom panel 102 when the battery enclosure 100 is assembled. The flange is clamped against the bottom panel 102 by the outer covers 110 and can press against a seal (not shown) around the perimeter of the bottom panel 102 to seal the internal cavity of the battery enclosure 100. A recess in the top cover 120 defines the cavity where the components of the battery are stored.

The top cover 120 and the bottom panel 102 may include an electromagnetic interference shielding layer and/or a fire resistant layer. The electromagnetic interference shielding layer may include a coating or metallic layer, such as a layer that forms or acts as a faraday cage to shield the battery from electromagnetic interference. The fire resistant layer may include fire retardant or non-flammable materials. Each of these may be incorporated in the top cover 120 and/or the bottom panel 102 or may be included in coatings or additional layers of the top cover 120.

Around the perimeter of the battery enclosure 100 are four outer covers 110. As described above, the outer covers 110 clamp or secure the top cover to the bottom panel. The outer covers 110 are removable, allowing access for maintenance of the battery. The outer covers 110 include attachment members 116 that are configured to secure the outer covers 110 to the bottom panel 102 and releasably secure the top cover 120 to the bottom panel 102. The bottom panel 102 may also include attachment members 116, such as threaded inserts, overmolded into the structure of the bottom panel 102 to which the attachment members 116 connect. The attachment member 116 may include a bushing integrally connected to the outer covers 110 and through which a screw passes to thread into a threaded insert of the bottom panel 102 to secure the outer covers 110, top cover 120, and bottom panel 102 together.

The outer covers 110 includes a honeycomb structure 114 that is positioned between an inner surface of the outer cover 110 and an outer surface of the top cover's side walls 120. The honeycomb structure 114 provides protection against crushing forces experienced on the sides of the battery enclosure 100 due to impact. The honeycomb structure 114 may be integrated with the outer covers 110, such as by injection molding or may be a separate piece placed between the outer covers 110 and the top cover 120.

The honeycomb structure 114 includes a honeycomb pattern extruded in a single direction and formed of a thermoplastic material. Though a honeycomb structure 114 is shown and described, other crushable energy absorbing media may be substituted in the location of the honeycomb structure 114 to provide a similar benefit. For example, metal foams, cushioning materials, and other crushable or energy absorbing materials may be suitable.

Figure 3:
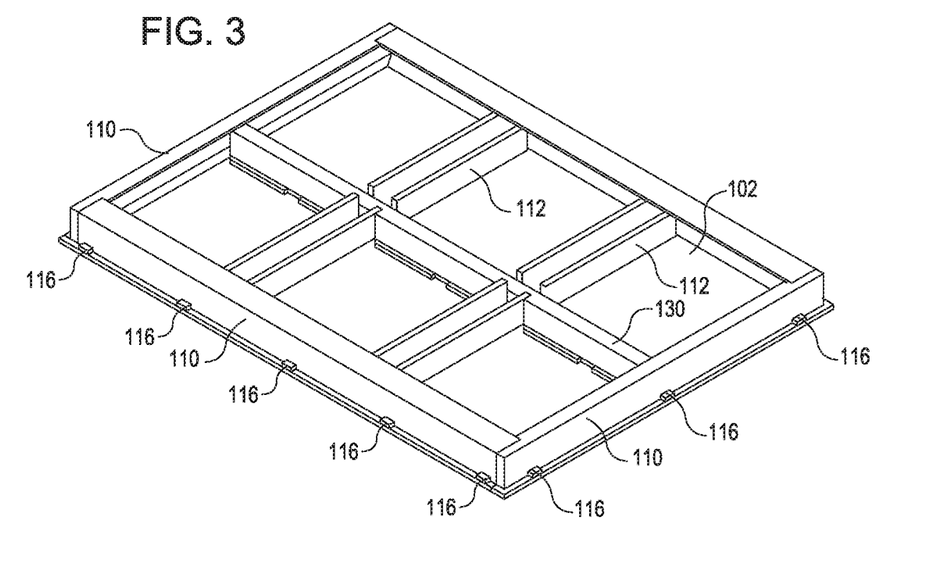
FIG. 3 is a perspective view of a organosheet battery enclosure with the top cover removed, according to some embodiments.

FIG. 3 is a perspective view of a battery enclosure 100 with the top cover 120 removed. The outer covers 110 are shown coupled to the bottom panel 102 with the crossbeams 112 and the longitudinal beam 130 in place as described above with respect to FIGS. 1 and 2. The outer covers 110, bottom panel 102, crossbeams 112, and longitudinal beam 130 are the same as shown and described above.

The crossbeams 112 and longitudinal beam 130 define six recesses or cavities in which components of the battery may rest or be secured. For example, each of the cavities may contain one or more battery cells, cooling units, and other hardware for the battery. As described above, the use of more than four crossbeams 112 or different arrangements of the longitudinal beam 130 and crossbeams 112 will result in different shaped or sized cavities to hold battery components and may be shaped as desired to pack as many battery components into the battery enclosure 100 as possible to maximize the energy storage capacity of the battery.

Figure 4:
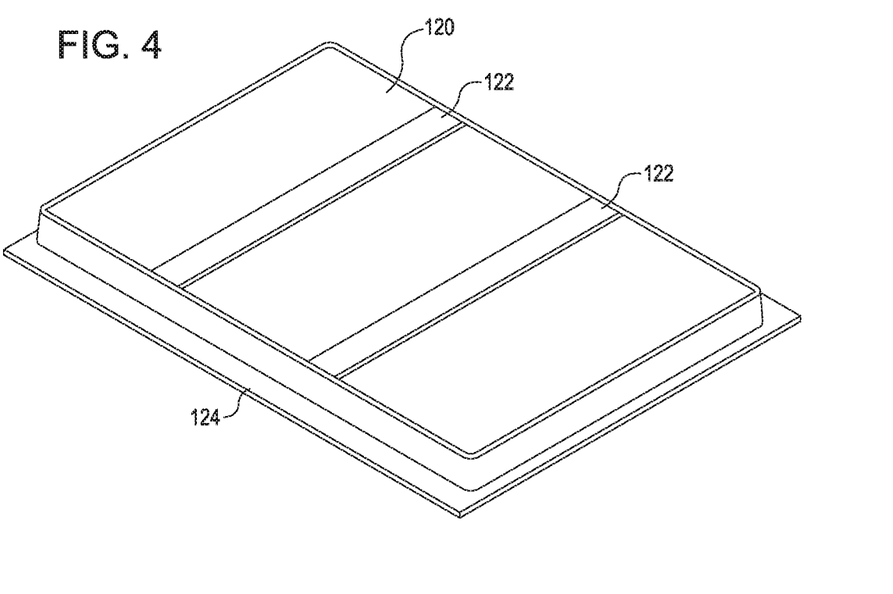
FIG. 4 is a perspective view of the top cover of the battery enclosure of FIG. 1, according to some embodiments.

FIG. 4 is a perspective view of the top cover 120 of the battery enclosure 100 of FIG. 1, according to some embodiments. The top cover 120 is formed of the organosheet material and includes reinforcing strips 122 that provide additional structural support to the battery enclosure 100. The reinforcing strips 122 may include carbon fiber or glass fiber reinforcements, such as a unidirectional tape applied to the thermoplastic material and molded into the shape of the top cover 120. The reinforcing strips 122 are shown on an upper surface of the top cover 120, but may be positioned on an interior surface of the top cover 120, or both in some examples.

The top cover 120 has a generally rectangular shape and is designed to pack battery components within the recess molded in the top cover 120. In some examples the top cover 120, and the battery enclosure 100, may have a non-rectangular shape, for example to fit in a particular location of a vehicle around other functional and structural elements of the vehicle.

The top cover 120 includes a flange 124 that extends from side walls of the top cover beyond the recess formed in the top cover 120. The flange 124 is parallel to the surface of the recessed portion and mates with the bottom panel 102 to enclose the inner cavity of the battery enclosure 100. The flange 124 may be compressed or clamped against a seal, such as an O-ring, around the perimeter of the bottom panel 102 to seal the internal cavity from external elements or intrusion.

FIG. 5 is a simplified diagram showing a process 500 for forming overmolded components of a battery enclosure 100. The process 500 may be performed by a single apparatus such as an assembly line or by a variety of machines in sequence. The process 500 may be used to form the bottom panel 102, crossbeams 112, longitudinal beam 130, top cover 120, and outer covers 110.

At 502 the process 500 includes cutting a organosheet sheet 520, such as a sheet of prepreg material, to the size of a blank 522 for forming a component of the battery enclosure 100. For example, the blank 522 for the top cover 120 may be a rectangular shape. The cutting may be performed by a die cutting machine, rotary cutter, or any other suitable cutting device. Multiple layers of the organosheet sheet 520 may be layered and cut at once, for example when multiple layers will be used to form a single component.

At 504, the process 500 includes applying unidirectional tape strips 524 to the blank 522. The unidirectional tape strips 524 may include carbon fiber or glass fiber reinforcing material or may include other forms of reinforcement such as additional thermoplastic material or other such materials. The unidirectional tape strips 524 are applied such that after the component is formed by process 500, the unidirectional tape strips 524 reinforce particular areas of weakness or areas requiring additional strength or support. In some examples, the blank 522 may not have any unidirectional tape strips 524 applied.

At 506, the process 500 includes heating the blank 522. The blank 522 with the unidirectional tape strips applied thereto can be heated in a press 526 to press the components together as they are heated and become pliable. The heating of the thermoplastic material allows the thermoplastic of the blank 522 to fuse together into a single component with the unidirectional tape strips 524.

At 508, the process 500 includes placing the blank 522 into a mold 528. The blank 522 typically has been heated previous to this step and is prepared for shaping. The mold 528 includes a passage 530 for injection of thermoplastic material to overmold additional features or geometry onto the blank 522 as it is formed in the mold. In some examples, the mold 528 may receive one or more additional elements, such as threaded inserts, bushings, metal plates, honeycomb structure, and other pieces that will be overmolded to become integral with the blank 522.

At 510, the process 500 includes applying force to the mold 528 to form the blank 522 into the desired shape. At the same time, pressure is applied to drive thermoplastic material 532 through the passage 530 into the mold for the overmolding process. The thermoplastic material 532 may, for example, be forced by an injection molding apparatus to enter through the passage 530.

At 512, the process 500 includes cooling the mold 528 to solidify the thermoplastic material 532 and complete the overmolding process. The thermoplastic material 532 and the blank 522 set in the shape of the mold, setting the final shape of the component formed by the process 500.

At 514, the completed component 536 with the overmolded features 534 is removed from the mold 528 in its completed form for further assembly.

FIG. 6 is a simplified diagram showing a process 600 for assembling components of a battery enclosure 100. The process 600 includes joining the components into subassemblies that can be releasably joined together to form the battery enclosure 100.

The components of the battery enclosure 100 are formed separately and then joined as shown in FIG. 6. For example, the various components may each be formed by a process such as the process 500 of FIG. 5 before being assembled as shown in FIG. 6.

In particular, the crossbeams 112 are joined to the top cover 120. The joining may be accomplished by thermoplastic welding or through structural fasteners such as screws. The thermoplastic welding may include hot plate welding, infrared welding, ultrasonic welding, vibration welding, friction welding, bonding, or other such welding processes that join thermoplastics together by melting and fusing. In some examples, the components may be joined by bonding with adhesives such as glues or other such materials.

The outer covers 110 may be integrally formed with the honeycomb structures 114 described and may be removable with respect to top cover 120. The outer covers 110 are coupled with the top cover 120 to form a top cover subassembly 160. In some examples, the outer covers 110 may be joined or fused to the top cover 120 permanently to form the top cover subassembly 160 in a single component that attaches to the bottom panel 102.

The bottom panel 102 receives the components of the battery including the cooling units 140 that are provided to cool the battery as well as the cells 150 that make up the energy storage of the battery. As described above, the bottom panel 102 may be a single flat sheet with structural ribs 104 that receive the cooling units 140 and the cells 150 or may include recesses to receive the cooling units 140 and cells 150. The cooling units 140 and cells 150 may be permanently installed or removably coupled to the bottom panel 102 to allow for maintenance or replacement of cells 150 if needed. When combined together, the bottom panel 102, the cells 150, and the cooling units 140 form a bottom subassembly 170. The bottom subassembly 170 and the top cover subassembly 160 releasably couple together via the attachment member 116 to form the battery enclosure 100 and the completed battery.

Figure 7:
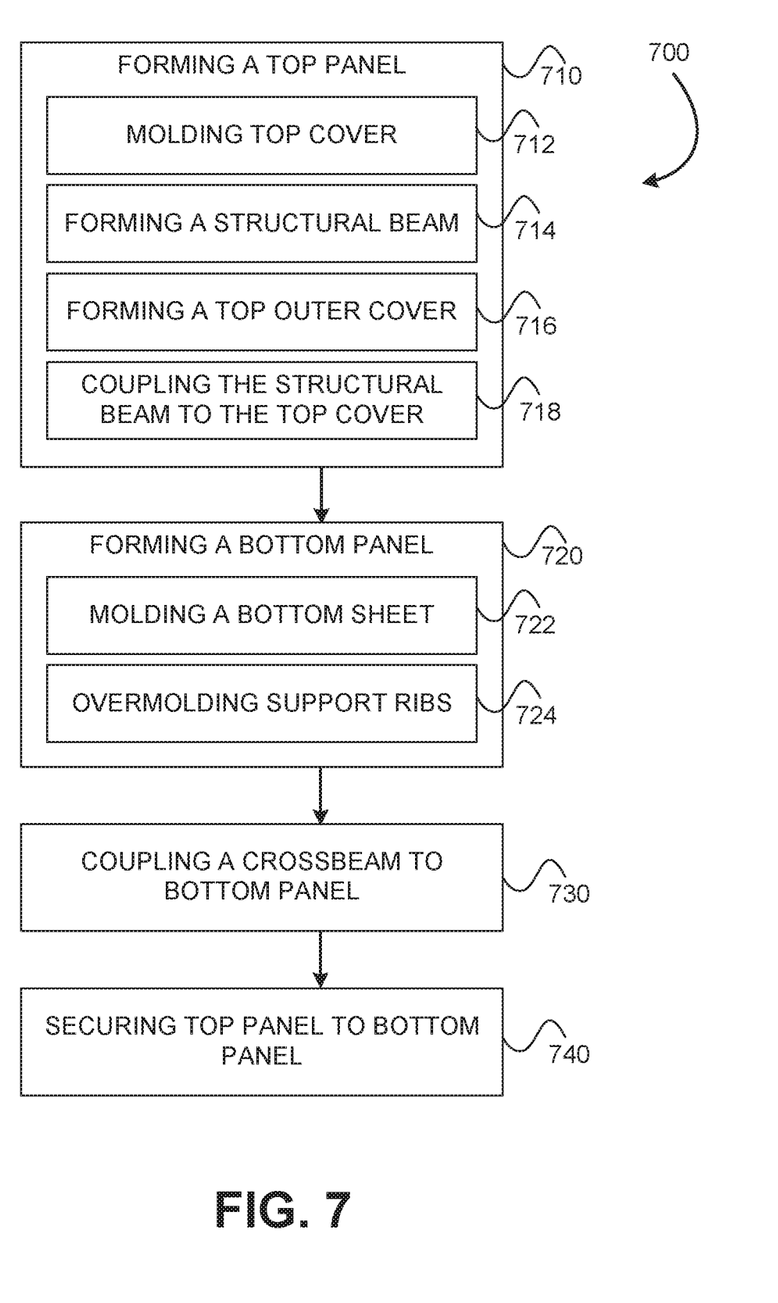
FIG. 7 is a flow chart depicting a simplified process for forming a thermoplastic polymer battery enclosure, according to some embodiments.

FIG. 7 is a flow chart depicting a process 700 for forming a battery enclosure 100. The process may be carried out by a single apparatus, by a number of machines in a particular sequence, or in varying orders. Though the steps presented are shown in sequential order, the steps may be performed in any order as needed.

At 710, the process 700 includes forming a top panel. The top panel includes the top cover 120, the crossbeams 112, and may include the outer covers 110. The top panel may include the top cover subassembly 160 of FIG. 6. Forming the top panel may include a number of subprocesses including molding the top cover 120, forming the crossbeam 112, forming the outer cover 110, and coupling the crossbeams 112 to the top cover 120.

At 712, the process 700 includes molding the top cover 120. The top cover 120 may be molded using process 500 to form the recessed cavity and the flanges 124 of top cover 120. The top cover 120 may be formed of organosheet sheets as described above.

At 714, the process 700 includes forming a crossbeam 112. The crossbeam 112 is formed by process 500 and includes overmolding structural ribs out of thermoplastic material onto the crossbeam 112 to increase the strength and rigidity of the crossbeams 112. The crossbeam 112 is formed of organosheet sheets and thermoplastic material as described above.

At 716, the process 700 includes forming the outer cover 110. The outer cover 110 may be formed in several steps, such as molding the flanges in a first step, forming or attaching the attachment member 116 in a second step, and securing the honeycomb structure 114 in a third step. One or all of these steps may be performed at once by overmolding the outer cover with the attachment member 116 and the honeycomb structure 114 according to process 500.

At 718, the process 700 includes coupling the crossbeam 112 to the top cover 120. This may be accomplished by welding, fusing, or securing with fasteners, the crossbeam 112 to the inner surface of the recess of the top cover 120.

At 720, the process 700 includes forming the bottom panel 102. The bottom panel 102 may be formed in a number of subprocesses that may be accomplished sequentially or all at once, such as according to the process 500. The bottom panel 102 is formed by first molding a bottom sheet at 722. This may include cutting a blank from a sheet of organosheet and also may include forming one or more recesses to accept or receive components of the battery. The bottom panel 102 is further formed by securing or forming structural ribs 104 onto the bottom panel 102. This may be accomplished, for example, by overmolding the bottom panel 102 according to process 500.

At 730, the process 700 includes coupling a longitudinal beam 130 to the bottom panel 102. The longitudinal beam 130 may be formed according to the same method as the crossbeams 112, according to process 500. The longitudinal beam 130 may be permanently affixed to the bottom panel, for example by welding, adhesive, or overmolding, or may be releasably coupled to the bottom panel 102.

At 740, the process 700 includes securing the top panel to the bottom panel. This step includes coupling the top cover 120, with the crossbeams 112 attached thereto, to the bottom panel 102 and securing the two together by coupling the outer covers 110 to the bottom panel 102, sandwiching the top cover 120 in between. The outer covers 110 are secured to the bottom panel 102 by connecting the attachment members 116 of the outer covers 110 to the bottom panel to form the battery enclosure 100. The battery enclosure 100 has battery components such as cooling units and cells inserted into the internal cavity of the battery enclosure 100 before securing the bottom panel 102 and the top panel together.

While the present subject matter has been described in detail with respect to specific aspects thereof, it will be appreciated that those skilled in the art, upon attaining an understanding of the foregoing, may readily produce alterations to, variations of, and equivalents to such aspects. Numerous specific details are set forth herein to provide a thorough understanding of the claimed subject matter. However, those skilled in the art will understand that the claimed subject matter may be practiced without these specific details. In other instances, methods, apparatuses, or systems that would be known by one of ordinary skill have not been described in detail so as not to obscure claimed subject matter. Accordingly, the present disclosure has been presented for purposes of example rather than limitation, and does not preclude the inclusion of such modifications, variations, and/or additions to the present subject matter as would be readily apparent to one of ordinary skill in the art.

The specification and drawings are, accordingly, to be regarded in an illustrative rather than a restrictive sense. It will, however, be evident that various modifications and changes may be made thereunto without departing from the broader spirit and scope of the disclosure as set forth in the claims. It should be noted that the systems and devices discussed above are intended merely to be examples. It must be stressed that various embodiments may omit, substitute, or add various procedures or components as appropriate. Also, features described with respect to certain embodiments may be combined in various other embodiments. Different aspects and elements of the embodiments may be combined in a similar manner. Also, it should be emphasized that technology evolves and, thus, many of the elements are examples and should not be interpreted to limit the scope of the invention.

Specific details are given in the description to provide a thorough understanding of the embodiments. However, it will be understood by one of ordinary skill in the art that the embodiments may be practiced without these specific details. For example, well-known structures and techniques have been shown without unnecessary detail in order to avoid obscuring the embodiments. This description provides example embodiments only, and is not intended to limit the scope, applicability, or configuration of the invention. Rather, the preceding description of the embodiments will provide those skilled in the art with an enabling description for implementing embodiments of the invention. Various changes may be made in the function and arrangement of elements without departing from the spirit and scope of the invention.

The use of the terms "a" and "an" and "the" and similar referents in the context of describing the disclosed examples (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening. As used herein, the terms "top" and "bottom" can be associated with vertical positions when the air legs of the cleaning machine are oriented vertically. However, in some cases, the cleaning machine may use air legs or configurations in non-vertical directions, in in which case the terms "top" and "bottom" may refer to positions not vertical but oriented diagonally as well. Recitation of ranges of values herein are merely intended to serve as a shorthand method of referring individually to each separate value falling within the range, unless otherwise indicated herein and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate examples of the disclosure and does not pose a limitation on the scope of the disclosure unless otherwise claimed. No language in the specification should be construed as indicating any non-claimed element as essential to the practice of the disclosure.

Having described several embodiments, it will be recognized by those of skill in the art that various modifications, alternative constructions, and equivalents may be used without departing from the spirit of the invention. For example, the above elements may merely be a component of a larger system, wherein other rules may take precedence over or otherwise modify the application of the invention. Also, a number of steps may be undertaken before, during, or after the above elements are considered. Accordingly, the above description should not be taken as limiting the scope of the invention.

What is claimed is:

1. A battery enclosure for a battery of a vehicle system, the battery enclosure comprising:
    a bottom panel comprising:
        a first reinforced thermoplastic composite sheet;
        a plurality of recesses defined in a surface of the first reinforced thermoplastic composite sheet, each of the plurality of recesses comprising at least one sidewall that defines a boundary of the respective recess;
        a plurality of structural ribs formed of thermoplastic material to distribute weight, wherein each structural rib comprises an angled member that extends between and couples the surface of the first reinforced thermoplastic composite sheet with a respective sidewall of a corresponding one of the plurality of recesses; and a first attachment member positioned at a perimeter of the bottom panel;

a top panel to enclose cells of the battery when coupled to the bottom panel, the top panel comprising:

a top inner cover comprising a second reinforced thermoplastic composite sheet molded to define a cavity; and one or more crossbeams coupled to an inner surface of the top inner cover;

one or more outer covers comprising:

an outer flange having a second attachment member included therein to releasably couple to the first attachment member;

a thermoplastic structural honeycomb; and an inner flange to retain the top panel in position when the one or more outer covers are secured to the bottom panel.

2. The battery enclosure of claim 1, wherein the one or more crossbeams comprise a third reinforced thermoplastic composite sheet and integrally formed thermoplastic support ribs.

3. The battery enclosure of claim 2, wherein the first reinforced thermoplastic composite sheet, the second reinforced thermoplastic composite sheet, and the third reinforced thermoplastic composite sheet comprise an identical thermoplastic material.

4. The battery enclosure of claim 1, further comprising a longitudinal beam coupled to the bottom panel, and wherein the longitudinal beam and the one or more crossbeams define a plurality of positions to receive the cells of the battery.

5. The battery enclosure of claim 4, wherein the longitudinal beam is formed of a reinforced thermoplastic composite.

6. The battery enclosure of claim 5, wherein the longitudinal beam comprises integrally formed attachment points for components of the battery.

7. The battery enclosure of claim 1, wherein the first reinforced thermoplastic composite sheet is reinforced with at least one of glass fibers or carbon fiber.

8. The battery enclosure of claim 1, wherein the one or more crossbeams and the first attachment member are integrally formed onto the first reinforced thermoplastic composite sheet.

9. The battery enclosure of claim 1, wherein the top inner cover and the bottom panel each further comprise an electromagnetic interference shielding layer and a fire resistant layer.

10. The battery enclosure of claim 1, wherein the one or more crossbeams are coupled to the top inner cover by at least one of:

hot plate welding;
infrared welding;
ultrasonic welding;
vibration welding;
friction welding;
bonding; or
structural fasteners.

11. The battery enclosure of claim 1, wherein the one or more outer covers are coupled to the top inner cover at a perimeter of the top inner cover.

12. The battery enclosure of claim 11, wherein the structural honeycomb is formed of a thermoplastic and positioned around the perimeter of the top inner cover to protect an internal compartment of the battery enclosure from impacts.

13. The battery enclosure of claim 1, wherein the bottom panel comprises an integrated seal around the perimeter of the bottom panel that seals an internal space of the battery enclosure when the bottom panel, top panel, and one or more outer covers are coupled together.

14. The battery enclosure of claim 1, wherein the one or more outer covers are integrated with the top inner cover.

15. The battery enclosure of claim 1, wherein each angled member is triangular in shape.

16. The battery enclosure of claim 1, wherein each of the plurality of ribs is formed integrally with the first reinforced thermoplastic composite sheet.

* * * * *